March 16, 1937. W. H. FREYGANG 2,073,688
AIRCRAFT FLOTATION SYSTEM
Filed July 14, 1934 3 Sheets-Sheet 1
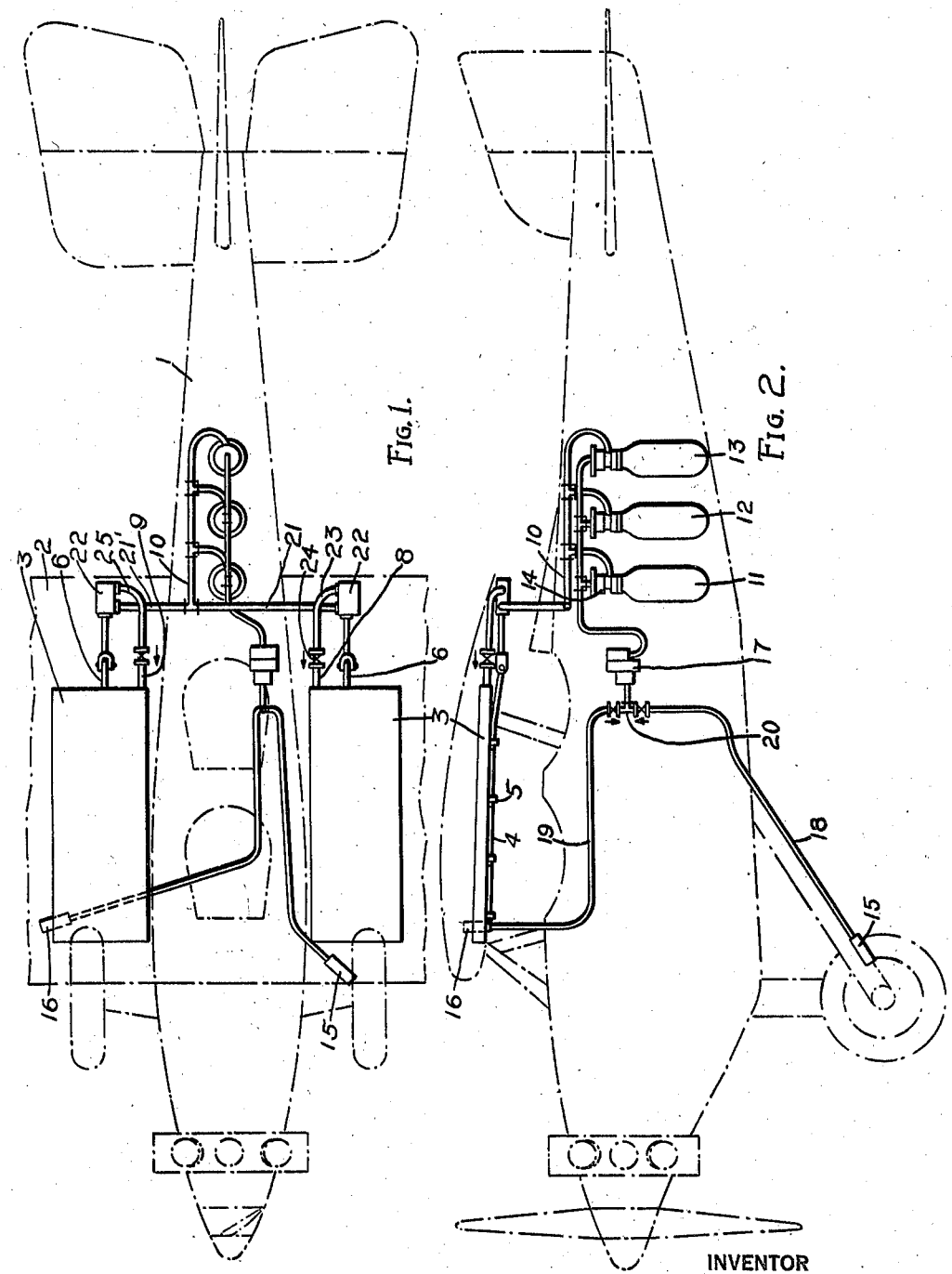
INVENTOR
WALTER H. FREYGANG
BY
J. William Carson
ATTORNEY

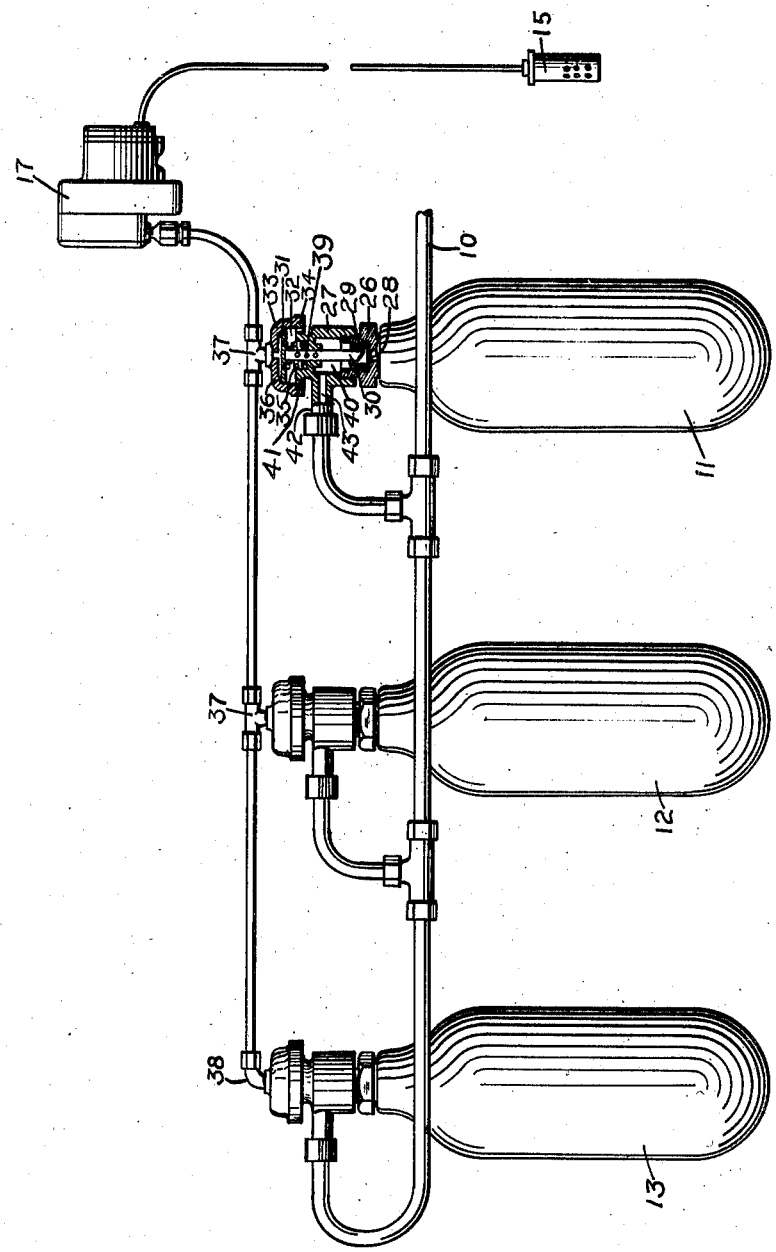

March 16, 1937.　　W. H. FREYGANG　　2,073,688
AIRCRAFT FLOTATION SYSTEM
Filed July 14, 1934　　3 Sheets-Sheet 3

INVENTOR
WALTER H. FREYGANG
BY
J. William Carson
ATTORNEY

Patented Mar. 16, 1937

2,073,688

UNITED STATES PATENT OFFICE 2,073,688

AIRCRAFT FLOTATION SYSTEM

Walter H. Freygang, Weehawken, N. J., assignor to Walter Kidde & Company, Inc., Bloomfield, N. J., a corporation of New York Application July 14, 1934, Serial No. 735,151

7 Claims. (Cl. 221—73.5)

The present invention relates to a flotation system for aircraft of the type comprising an arrangement wherein inflatable bags are provided on the aircraft and are adapted to be inflated with a buoyant fluid when the aircraft descends upon a body of water. When inflated, the bags form buoyant floats for supporting the aircraft and prevent it from sinking.

In aircraft flotation systems of this type, it is highly important that the fluid should not be released prior to the alighting of the aircraft upon the water, since the great resistance offered by the inflated devices to the travel of the aircraft through the air would be extremely hazardous to the continued flight of the aircraft.

In order to eliminate, as far as possible, the personal element as a factor in the operation of systems of this character, the present invention has been developed and provides an apparatus wherein the supply of buoyant fluid is automatically released to inflate the inflatable bags upon contact of the aircraft with any body of water upon which it should alight.

In systems of this type for use on aircraft it is desirable that the weight of the equipment be as light as possible, and that the means for effecting the operation of the apparatus be simple and especially reliable under the emergency conditions for which the system is required.

It is accordingly an object of the present invention to provide an aircraft flotation system which is both light and compact, and in which the requisite operating force is obtained from means simple in construction and reliable in operation.

Another object of the invention is to provide an aircraft flotation system wherein the supply of buoyant fluid is automatically released from a plurality of containers thereof to inflate the inflatable bags upon contact of the aircraft with any body of water upon which it should alight.

A further object of the invention is to provide a system of the above character which functions automatically upon contact of the aircraft with water regardless of whether the aircraft alights upon the water in an upright or in an inverted position.

A further object of the invention is to provide a mechanism which effectively prevents accidental inflation of the flotation bags upon accidental discharge of the buoyant fluid due to dangerous increases in temperature and pressure of the inflating medium stored in the containers.

A further object of the invention is to provide a system for releasing pressure fluid in a plurality of containers in which the accidental discharge of fluid from one or more containers due to dangerous increases in temperature and pressure of the contained fluid will not cause operation of the remaining containers with attendant loss of the fluid supply.

In the preferred embodiment of the invention a buoyant fluid is contained in a pressure container sealed by a frangible disc adapted to be pierced by a puncturing member normally maintained out of contact with the frangible disc, but operable to pierce the disc by pressure developed by a cartridge fired by means operable by pressure developed upon immersion in water of an actuator member designed to build up an actuating pressure in a volume of air trapped upon immersion of the actuator in water.

Further objects and features of the invention, not specifically enumerated above, will be apparent as the invention is described in greater detail in connection with the accompanying drawings, wherein:

Figure 1 is a plan view showing flotation equipment constructed in accordance with the present invention and applied to an aeroplane which is indicated in dot and dash lines.

Figure 2 is a view in side elevation showing the equipment of Figure 1 and likewise the aeroplane upon which it is installed, the aeroplane being shown in dot and dash lines.

Figure 3 is a view, partly in transverse section, showing a container, its releasing mechanism, a pressure developing unit, and an actuator, all in accordance with the present invention.

Figure 4:
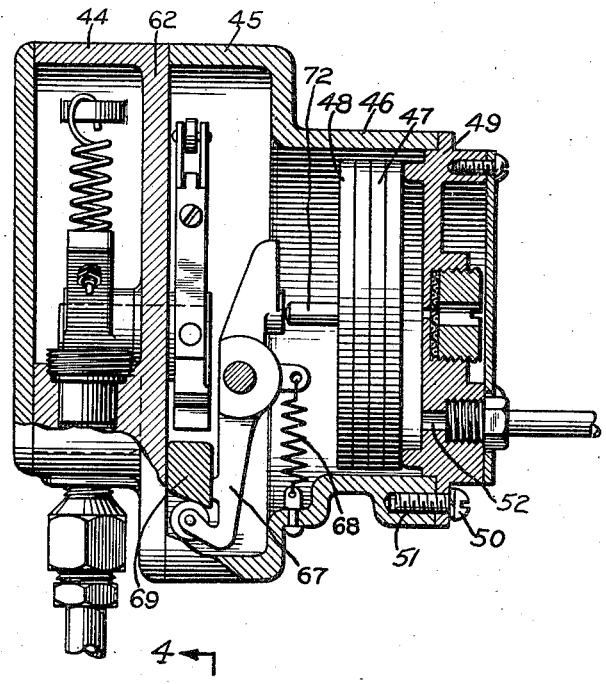
Figure 4 is an enlarged view, in cross-section, of a pressure developing unit in accordance with the invention, the section being taken on the line 4—4 of Figure 5 and looking in the direction of the arrows.

Referring to Figures 1 and 2 of the above drawings, an aeroplane fuselage is indicated at 1, and the wing of the aeroplane at 2. On the underneath side of the wing and within the stream line of the wing are set flotation bag containers 3, each containing a normally deflated flotation bag retained within the container by means of wires 4 which pass through ringlets 5 to maintain the cover of each container closed. In order that the flotation bags may be secured effectively to the plane rope loops are secured to the bags and in turn to the structure of the wing of the plane. A cable or rod 6 operates all of the wires 4 to disengage the ringlets 5, thus enabling a container 3 to be opened. When, therefore, a flotation bag is inflated by a compressed fluid, such as air or carbon dioxide, the bag expands and frees itself from the container, the cover being so constructed as to permit the bag to assume its inflated position. For the purpose of expanding the flotation bags, conduits 8 and 9 are connected to the respective bags, the conduits being respectively connected by a common delivery conduit 10 to the pressure medium containers 11, 12 and 13.

Each of the pressure medium containers 11, 12 and 13 is provided with a releasing mechanism 14, described in detail hereinafter, the releasing mechanisms of the several pressure medium containers being actuated by a pressure developed by means actuated by pressure developed upon immersion in water of one of the actuator members 15 or 16, the operating pressure being transmitted to a pressure developing unit 17, through either the tube 18 or the tube 19, both of which are connected to the pressure inlet connection of the unit 17 through a one-way valve arrangement 20, whereby pressure developed in either actuator is prevented from escaping through the other actuator.

Upon release of the medium within the pressure medium containers 11, 12 and 13, it passes into the common delivery conduit 10, and thence through branch conduits 21 and 21' into one end of piston bag releases 22, driving the pistons toward the right, as viewed in Figures 1 and 2, and disengaging the wires 4 from the ringlets 5. When the piston in the piston bag release connected to the branch conduit 21 reaches the end of its stroke, the medium escapes through a conduit 23, a check valve 24 and the conduit 8 into the flotation bag, thus causing it to expand in accordance with the pressure of the medium. During the inflation of the bag the cover of the container 3, containing such bag, lifts so as to permit the free inflation of the bag. By providing a check valve as indicated at 24 the medium which has expanded into the flotation bag is prevented from escaping therefrom, continued passage of the medium into the bag being freely permitted. The flotation bag contained in the other container 3 is similarly inflated through a conduit 25, another check valve 24, and the conduit 9.

Referring now to Figure 3 of the drawings, containers 11, 12 and 13 are provided, within which a supply of a medium under pressure is maintained by means of closure bodies 26 and bonnets 27, as shown in detail in connection with the releasing mechanism of the container 11. Each closure body 26 is threaded into the top of its respective container and is provided with a frangible disc 28 secured in position by a nut 29. A cutter 30 is movable within the nut 29, the cutter being carried by a piston 31 engaging with a close-working fit the side wall of a chamber 32 formed in a head 33, which is secured by screw threads 34 to the bonnet 27. A coiled spring 35 serves to yieldingly maintain the piston 31 in its uppermost position against a shoulder 36 formed in the chamber of the head 33, the spring 35 thereby serving to keep the cutter 30 out of contact with the frangible disc 28.

The spaces above the pistons of the several containers 11, 12 and 13 are all connected to the pressure developing unit 17 through T fittings 37 and an L fitting 38 and connecting tubing, which latter in turn is connected to the actuators 15 and 16; the discharge outlets of the several releasing mechanisms being connected to the common delivery conduit 10.

In order to prevent the discharge of the pressure medium from the container into the flotation bags in the event of rupturing of the frangible disc 28 due to the development of an excessive temperature and pressure in the container, at the same time permitting the pressure fluid to be discharged into the flotation bags when the flotation system is operated in the desired manner, a special construction is employed. This construction comprises the employment of one or more perforations 39 in the walling of the hollow tubular cutter 30, these perforations being normally in communication with the chamber 32 of the head 33 when the piston 31 is in its uppermost position; the perforations entering into communication with the chamber 40, which is formed between the closure body 26 and the bonnet 27, when the cutter 30 is advanced to pierce the frangible disc. The bonnet 27 is provided with one or more openings 41 establishing communication between the chamber 32 and the outer atmosphere, so that, if the pressure fluid is released from the container 11 by rupturing of the frangible disc 28 due to the development of an excessive pressure within the container, the pressure fluid will be discharged through the hollow tubular cutter 30, the perforations 39, the chamber 32 and the openings 41 to the outer atmosphere, thus relieving the pressure within the container, but preventing undesirable and hazardous inflation of the flotation bags during the flight of the aircraft. For the discharge of the pressure medium into the flotation bags, the bonnet 27 is provided with an outlet 42 having a passage 43 communicating with the chamber 40. When, therefore, the cutter 30 is caused to pierce the frangible disc 28 by advancing the cutter through the frangible disc, the pressure medium flows from the container, through the hollow tubular cutter 30, through the perforations 39, into the chamber 40, and out through the passage 43 in the outlet connection 42. The outlet connection 42, of course, may be connected to a conduit 21 as shown in Figure 1 of the drawings.

Figure 5:
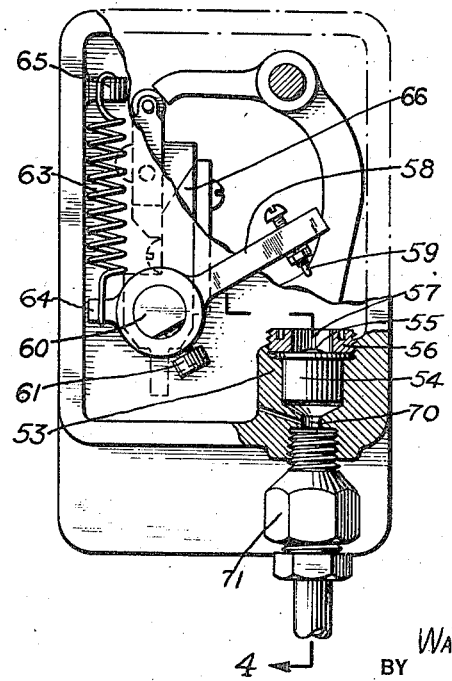
Figure 5 is a special view taken at right angles to Figure 4 and looking from the left, this view showing certain details of construction in several planes.

The pressure developing unit 17 will now be described with reference to Figures 4 and 5, in which 44 is a cartridge chamber, 45 a lever chamber, and 46 an extension of the lever chamber containing a bellows-like member 47 provided with a closed end 48 and supported on its open end by means of an airtight connection with the member 49. The member 49 is supported on the extension 46 of the lever chamber 45 by means of screws 50 inserted into supporting lugs 51 carried on the extension 46. A passage 52 in the member 49 communicates with the interior of the bellows-like member 47 and is adapted to be connected to the actuators 15 and 16, as already described.

Mounted within one corner of the cartridge chamber 44 is a boss 53 bored out to receive a pressure developing cartridge 54 containing gun powder or the like, the cartridge 54 being provided with a fulminate of mercury detonating cap 55 retained within the bore of the boss 53 by means of a ring nut 56 having a central bore 57. A lever 58 carrying a firing pin 59 is mounted on a spindle 60 by means of a set screw 61, the spindle passing through the wall 62 between the cartridge chamber 44 and the lever chamber 45 into the lever chamber. A relatively heavy coiled tension spring 63 is arranged to engage a lug 64 on the lever 58 and another lug 65 mounted on a side wall of the cartridge chamber, the tendency of the spring 63 being to normally urge rotation of the lever 58 in a clockwise direction as viewed in Figure 5.

In order to normally restrain rotation of the lever 58, a lever system is provided in the lever chamber 45, the first lever of the system being shown at 66, said lever being secured to the end of the spindle 60 projecting within the lever chamber, and the last lever of the system being shown at 67, a coiled spring 68 tending to maintain the lever 67 normally in engagement with the lever 69. The lever system will not be described in detail, as any suitable lever system may be employed, so long as it serves to reduce by successive steps the amount of force required to release the spring energized lever 58. A suitable lever system, for example, is shown and described in the copending application of Daniel Mapes, Serial No. 515,717, filed February 1, 1931.

The lower end of the bore of the boss 53 in the cartridge chamber is provided with a passage 70, which is enlarged to receive a coupling member 71, within which is secured the tubing which connects the pressure developing unit with the spaces above the pistons of the releasing mechanisms of the several pressure medium containers, as previously described in connection with Figure 3 of the drawings.

While the manner of operation of the flotation system in accordance with the present invention is not difficult to understand, it is nevertheless pointed out that, upon immersion of either the actuator 15 or the actuator 16 in water, a volume of air is trapped in the actuator and in the tubing connecting the actuator to the pressure developing unit 17. The pressure developed in the volume of air so trapped serves to move the bellows-like member 47 toward the left, as viewed in Figure 4, carrying with it the pin 72, which presses against one end of the lever 67 and causes it to disengage the lever system. When this occurs, the lever 58 rotates rapidly under the influence of the spring 63 and causes the firing pin 59 to strike the fulminate of mercury detonating cap 57 with considerable force, the detonating cap setting off the charge of explosive powder within the cartridge 54, the high pressure of the explosive gases being transmitted through the passage 70, the coupling member 71 and the connecting tubing to the spaces above the pistons of the releasing mechanisms of the several containers, whereby the frangible disc cutters of the releasing mechanisms are operated to release the stored pressure medium from the containers 11, 12 and 13 into the common delivery conduit 10, from which the stored medium is delivered into the inflatable flotation bags, causing them to inflate and to prevent the aircraft from sinking.

It will, of course, be apparent that the present invention is not limited to the use of an explosive powder in the pressure developing cartridge 54, as any suitable substance may be employed so long as it evolves a relatively large volume of gases under pressure upon ignition thereof, whether such ignition results in relatively slow burning or in an actual explosion.

From the foregoing description it will be seen that I have provided a simple and effective means for releasing pressure fluid from one or more containers thereof, where only a small initial operating force is available, and it will be further seen that my invention accomplishes the various objects pointed out at the beginning of this specification. Finally, while my invention resides in certain principles of construction and operation which have been illustrated and described in connection with the accompanying drawings, it will be apparent to those skilled in the art that the invention may be embodied in other forms of construction without departing in any manner from the spirit and scope of the invention, and I therefore do not wish to be strictly limited to the disclosure, but rather to the scope of the appended claims.

I claim:—

1. In a releasing device for releasing a medium from a container in which the medium is stored under pressure, the combination of a body member to be secured to the container, a frangible disc carried by the body member and confining the medium within the container, disc rupturing means for rupturing the frangible disc to release the medium, means operable by developed fluid pressure to operate the disc rupturing means, a chamber containing an explosive substance capable of evolving gas under pressure upon setting-off thereof, means to explode said explosive substance, releasable means normally holding the last means in restraint, fluid pressure operated means to release said releasable means, means to develop an operating fluid pressure, means defining a fluid conducting path from said last named means to said fluid pressure operated means, and means defining a pressure transmitting path between the chamber containing said explosive substance and said means operable by developed fluid pressure.

2. In a releasing device for releasing a medium from a container in which the medium is stored under pressure, the combination of a body member to be secured to the container, a frangible disc carried by the body member and confining the medium within the container, disc rupturing means for rupturing the frangible disc to release the medium, means operable by developed fluid pressure to operate the disc rupturing means, a chamber containing a substance capable of evolving gas under pressure upon ignition thereof, means to ignite said gas evolving substance, releasable means normally holding the last named means in restraint, fluid pressure operated means to release said releasable means, means to develop an operating fluid pressure, means defining a fluid conducting path from said last named means to said fluid pressure operated means, and means defining a pressure transmitting path between the chamber containing said gas evolving substance and said means operable by developed fluid pressure.

3. In a releasing device for releasing a medium from a container in which the medium is stored under pressure, the combination of a body member to be secured to the container, a frangible disc carried by the body member and confining the medium within the container, disc rupturing means for rupturing the frangible disc to release the medium, a cylinder formed in said body member, a piston associated with said disc rupturing means movable in said cylinder by developed fluid pressure to operate the disc rupturing means, a chamber containing an explosive substance capable of evolving gas under pressure upon setting-off thereof, means to explode said explosive substance, releasable means normally holding the last named means in restraint, fluid pressure operated means to release said releasable means, means to develop an operating fluid pressure, means defining a fluid conducting path from said last named means to said fluid pressure operated means, and means defining a pressure transmitting path between the chamber containing said explosive substance and said cylinder.

4. In a releasing device for releasing a medium from a container in which the medium is stored under pressure, the combination of a body member to be secured to the container, a frangible disc carried by the body member and confining the medium within the container, disc rupturing means for rupturing the frangible disc to release the medium, means operable by developed fluid pressure to operate the disc rupturing means, a chamber containing a substance capable of evolving gas under pressure upon ignition thereof, means to ignite said gas evolving substance including an igniting element, means to urge said igniting element toward its igniting position, releasable means normally holding the last named means in restraint, and fluid pressure operated means to release said releasable means.

5. A system for releasing a medium from a plurality of containers in which the medium is stored under pressure by means of a relatively small operating fluid pressure, comprising restraining means actuatable by a relatively small operating fluid pressure, medium releasing means for each container, each comprising a frangible disc to confine the medium within the container, disc rupturing means for rupturing the frangible disc to release the medium, and means operable by the pressure of a fluid to effect operation of the disc rupturing means; and means operable upon actuation of said restraining means to generate a fluid pressure greater than the relatively small operating fluid pressure to obtain the desired fluid pressure to operate the disc rupturing means.

6. A fluid pressure developing unit operable by a relatively small operating fluid pressure to produce a relatively large operating fluid pressure comprising a chambered member containing a substance capable of evolving gas under pressure upon ignition thereof, means to ignite said gas evolving substance including an igniting element, means to urge said igniting element toward its igniting position, releasable means normally holding the last named means in restraint, and fluid pressure operated means to release said releasable means.

7. A fluid pressure developing unit operable by a relatively small operating fluid pressure to produce a relatively large operating fluid pressure comprising a chambered member containing an explosive substance capable of evolving gas under pressure upon setting-off thereof, means to explode said explosive substance including an exploding element, means to urge said exploding element toward its exploding position, releasable means normally holding the last named means in restraint, and fluid pressure operated means to release said releasable means.

WALTER H. FREYGANG.